US011124402B2

(12) United States Patent
Bulunmaz

(10) Patent No.: US 11,124,402 B2
(45) Date of Patent: Sep. 21, 2021

(54) AMBIENT FILLING SYSTEM AND METHOD

(71) Applicant: PepsiCo, Inc., Purchase, NY (US)

(72) Inventor: Enver Bulunmaz, Kemalpaşa-Izmir (TR)

(73) Assignee: PEPSICO, INC., Purchase, NY (US)

( * ) Notice: Subject to any disclaimer, the term of this patent is extended or adjusted under 35 U.S.C. 154(b) by 99 days.

(21) Appl. No.: 16/673,855

(22) Filed: Nov. 4, 2019

(65) Prior Publication Data

US 2020/0079634 A1 Mar. 12, 2020

Related U.S. Application Data

(62) Division of application No. 15/348,286, filed on Nov. 8, 2016, now Pat. No. 10,479,668.

(51) Int. Cl.
*B67C 3/10* (2006.01)
*A23L 2/54* (2006.01)
*B67C 3/26* (2006.01)
*B67C 3/22* (2006.01)
*B67C 7/00* (2006.01)

(52) U.S. Cl.
CPC ................... *B67C 3/10* (2013.01); *A23L 2/54* (2013.01); *B67C 3/225* (2013.01); *B67C 3/262* (2013.01); *B67C 3/2614* (2013.01); *B67C 7/00* (2013.01); *B67C 2003/228* (2013.01); *B67C 2003/2602* (2013.01); *B67C 2003/2677* (2013.01)

(58) Field of Classification Search
CPC .. B67C 3/262; B67C 3/10; B67C 3/06; B65B 31/00; B01F 3/04; A23L 2/54

USPC ............................................... 141/39
See application file for complete search history.

(56) References Cited

U.S. PATENT DOCUMENTS

| 3,381,723 | A | * | 5/1968 | Quest | .......................... | B67C 3/08 |
| | | | | | | 141/39 |
| 3,741,552 | A | | 6/1973 | Skoll et al. | | |
| 3,832,474 | A | | 8/1974 | Karr | | |
| 4,112,828 | A | | 9/1978 | Mojonnier et al. | | |
| 5,125,440 | A | | 6/1992 | Mette | | |
| 5,295,520 | A | | 3/1994 | Acker | | |
| 5,735,934 | A | | 4/1998 | Spears | | |
| 6,601,618 | B2 | * | 8/2003 | Tsukano | .................... | B67C 3/10 |
| | | | | | | 141/290 |
| 7,175,164 | B2 | | 2/2007 | Romanyszyn | | |
| 7,377,495 | B1 | | 5/2008 | Thompson et al. | | |
| 9,856,125 | B2 | * | 1/2018 | Clusserath | ................ | B67C 3/10 |

(Continued)

FOREIGN PATENT DOCUMENTS

| CN | 2557507 Y | 6/2002 |
| CN | 1917931 A | 2/2007 |

(Continued)

OTHER PUBLICATIONS

Communication Pursuant to Rule 164(1) EPC dated Jan. 14, 2021, for European Application No. 17870143.9, 18 pages.

(Continued)

*Primary Examiner* — Robert A Hopkins
(74) *Attorney, Agent, or Firm* — Sterne, Kessler, Goldstein & Fox P.L.L.C.

(57) ABSTRACT

Systems and methods for filling a beverage container with a carbonated fluid at ambient temperature while minimizing foam formation are provided. The carbonated fluid can maintain a laminar flow through the filling machine.

18 Claims, 4 Drawing Sheets

(56) References Cited

U.S. PATENT DOCUMENTS

| | | |
|---|---|---|
| 2012/0145750 A1 | 6/2012 | Hollars |
| 2012/0160330 A1 | 6/2012 | Cadeo |
| 2013/0092291 A1 | 4/2013 | Fiegler |
| 2016/0115009 A1 | 4/2016 | Clüsserath et al. |
| 2018/0020700 A1 | 1/2018 | Lucas |

FOREIGN PATENT DOCUMENTS

| | | | | |
|---|---|---|---|---|
| CN | 104229700 A | | 12/2014 | |
| EA | 11077 B1 | | 12/2008 | |
| EP | 0 900 761 B1 | | 11/2003 | |
| EP | 2786682 | | 9/2015 | |
| GB | 366095 A | | 1/1932 | |
| JP | 4886112 A | * | 11/1973 | ..... B67C 2003/2651 |
| JP | 06072490 A | * | 4/1985 | ............... H04N 5/14 |
| JP | 07291395 A | * | 11/1995 | ............... B67C 3/22 |
| JP | H 07-291395 A | | 11/1995 | |
| JP | 2000185796 A | * | 7/2000 | ............ B67C 3/28 |
| JP | 2000-281190 A | | 10/2000 | |
| JP | 2007302325 A | * | 11/2007 | .......... B67C 3/2614 |
| JP | 2012116571 A | * | 6/2012 | ............... B67C 3/02 |
| SU | 96979 A1 | | 11/1953 | |
| WO | WO 1998/047395 A2 | | 10/1998 | |
| WO | WO 2000/015539 A1 | | 3/2000 | |
| WO | WO 2010/017280 A1 | | 2/2020 | |

OTHER PUBLICATIONS

Markus Rammert, Zur Optimierung von Hochleistungsabfüllanlagen für $CO_2$-haltige Getränke, Jun. 30, 1993, XP055757596, Universtät-Gesamthoscschule Paderborn, 152 pages.

Notification of Transmittal of the International Search Report and the Written Opinion of the International Searching Authority, or the Declaration for PCT Application No. PCT/US17/59735, filed Nov. 2, 2017, 15 pages, dated Mar. 13, 2018.

PREMIX, Continuous Mixing System, TMCI Padovan Spa, Apr. 2016 (2 pages).

1_Innopro Paramix C Inline Blending System, KHS GmbH, Mar. 20, 2014 (2 pages).

Application Report, Food & Beverage, Krohne, May 2010 (6 pages).

Office Action directed to related Chinese Patent Application No. 201780068912.4, dated Jun. 25, 2021, with attached English-language translation; 18 pages.

Hu, Z. et al., "Soft Drink Production and Homemad Cold Drinks," Jindun Press, Beijing, Jan. 31, 1990; 14 pages.

* cited by examiner ns. Once the<br>

AMBIENT FILLING SYSTEM AND METHOD

CROSS-REFERENCE TO RELATED APPLICATIONS

This Application is a Divisional of U.S. patent application Ser. No. 15/346,286, filed Nov. 8, 2016, which is incorporated herein by reference in its entirety.

FIELD

Embodiments of the present invention relate to systems and methods for the filling of containers with a fluid, especially filling beverage containers with a carbonated fluid.

BACKGROUND

The three most common types of fluid filling systems are volumetric filling, time-metered filling, and weight-metered filling (gravimetric filling). All are commonly implemented in semi-automatic or automatic filling systems wherein empty containers are carried to filling positions. Once the containers reach the filling positions, they are stopped, filled to the desired degree by filling heads, and then transported to a desired location.

Volumetric filling systems (i.e. volume-metered filling) dispense a set volume of fluid into a container. For example, a chamber is set to a desired volume, the chamber is filled with fluid, and the contents of the chamber are then dispensed into a container.

Time-metered filling systems (i.e. time-metered volumetric filling) dispense fluid from a nozzle having a known volumetric flow rate for a set amount of time sufficient to fill the containers with a set volume of fluid.

Weight-metered systems (gravimetric) utilize a weight sensor which monitors the amount of fluid received by a container. The weight sensor provides feedback to the dispensing apparatus, which halts dispensation when a desired weight of fluid is received.

Cold filling operations utilize a refrigeration process for eliminating foaming of the carbonated beverage during filling. A large amount of energy is required to cool the carbonated fluid during the refrigeration process. This energy can result in increased operating costs.

BRIEF SUMMARY OF THE INVENTION

One aspect of the invention permits a filling system that utilizes an increased filling temperature, for example, ambient temperature. To achieve the increased filling temperature, the mixer and blower operating parameters can be modified along with a new filling system ventile design. The present invention permits filling of a container with a carbonated fluid at ambient temperatures.

In another aspect, the filling system can reduce foam formation by eliminating turbulent flow of a carbonated fluid within the filling system.

In an aspect of the invention, method of producing a container filled with a carbonated fluid product can include retaining treated water in a water tank, deaerating the water tank using a vacuum pump, mixing the treated water with a concentrate to create a fluid mixture, injecting the fluid mixture with carbon dioxide to create the carbonated fluid product, storing the carbonated fluid product in a carbonized tank that is fluidly connected to a filling machine, and operating the filling machine to fill the container with the carbonated fluid product. The treated water, fluid mixture, and carbonated fluid product can be maintained at an ambient temperature.

In a further aspect, a beverage container filling device for filling a beverage container with a fluid at an ambient temperature can include a support housing having an upper surface and a lower surface defining an inner fluid chamber for supplying the fluid material to be discharged into the container, a valve housing mounted to the lower surface for controlling the discharge of the fluid material, a vent tube having a first end and a second end, the second end at least partially extending through the valve housing, an umbellate ring surrounding the vent tube and being positioned adjacent the second end of the vent tube, a spring positioned about the first end of the vent tube, and a fluid sealing mechanism positioned adjacent to the upper surface and operating with the spring to control fluid flow into the beverage container.

In another aspect, a method of producing a container filled with a carbonated fluid product can include retaining treated water at an ambient temperature in a water tank, deaerating the water tank using a vacuum pump to create a negative pressure of at least 0.8 bar, mixing the treated water with a concentrate to create a fluid mixture, injecting the fluid mixture with carbon dioxide at a pressure in a range of approximately 3.2 bar to approximately 4.2 bar to create the carbonated fluid product, storing the carbonated fluid product in a carbonized tank that is fluidly connected to a filling machine, the carbonized tank having an interior pressure of approximately 5.5 bar, and operating the filling machine to fill the container with the carbonated fluid product, the filling machine having an interior pressure of approximately 5 bar, and the carbonated fluid product being at the ambient temperature. In this method, the filling machine can include a support housing having an upper surface and a lower surface defining an inner fluid chamber for supplying the fluid material to be discharged into the container, a valve housing mounted to the lower surface for controlling the discharge of the fluid material, a vent tube having a first end and a second end, the second end at least partially extending through the valve housing, an umbellate ring surrounding the vent tube and being positioned adjacent the second end of the vent tube, a spring positioned about the first end of the vent tube, and a fluid sealing mechanism positioned adjacent to the upper surface and operating with the spring to control fluid flow into the beverage container.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Features and advantages of the embodiments will become more apparent from the detailed description set forth below

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
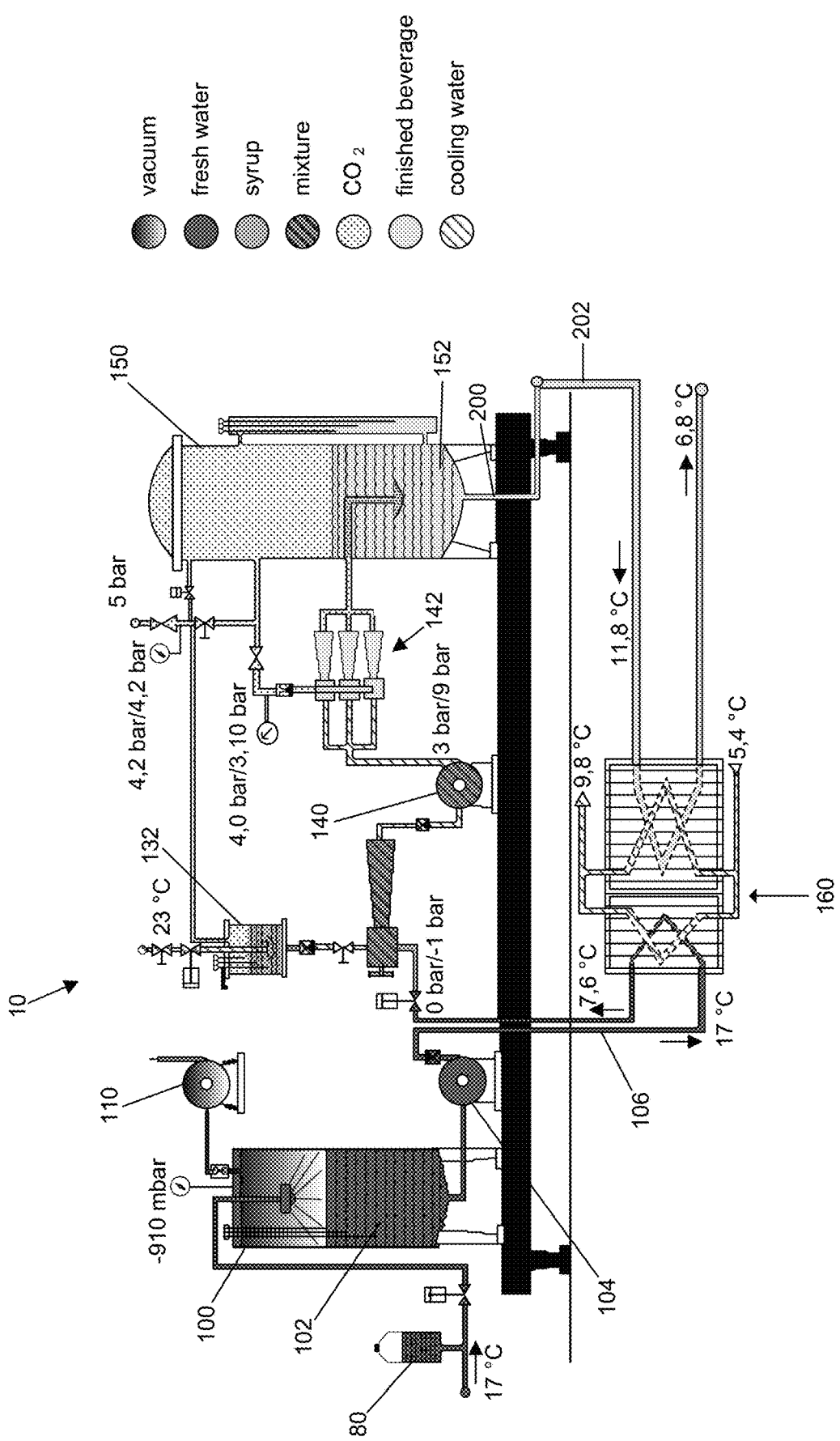
FIG. 1 is a schematic view of a fluid mixing system according to various aspects of the invention.

Referring to FIG. 1, a fluid mixing system 10 can include a treated water tank 100 that is fluidly connected to a treated water source 80. Treated water 102 can flow from treated water source 80 into treated water tank 100. Treated water 102 can enter treated water tank 100 at approximately 17 degrees Celsius. A vacuum pump 110 can remove the air and gases from within treated water tank 100. In one aspect, vacuum pump 110 can create a deaeration pressure within treated water tank 100 of at least approximately 0.8 bar. In another aspect, the deaeration pressure within treated water tank 100 can be approximately 0.91 bar.

A treated water pump 104 can pump treated water 102 from within treated water tank 100 to the next stage of mixing system 10. In one aspect, treated water pump 102 can pump treated water 102 through a cooling system 160 to reduce the temperature of treated water 102. In one aspect, cooling system 160 can reduce the temperature of treated water 102 from approximately 17 degrees Celsius before treated water 102 enters cooling system 160 to approximately 7.6 degrees Celsius after treated water 102 exits cooling system 160. In another aspect, treated water 102 can be maintained at ambient temperature in mixing system 10.

Mixing system 10 can include concentrate 132 in a concentrate tank 130. Concentrate 132 can be a beverage flavor syrup. Treated water 102 can mix with concentrate 132 to form a fluid mixture.

A carbonized pump 140 can inject carbon dioxide into the fluid mixture in carbon dioxide dosing apparatus 142 to create a carbonized fluid mixture, i.e., product fluid 152. In one aspect, carbon dioxide injection in carbon dioxide dosing apparatus 142 can occur at a pressure in a range of approximately 3.2 bar to approximately 4.2 bar.

Figure 3:
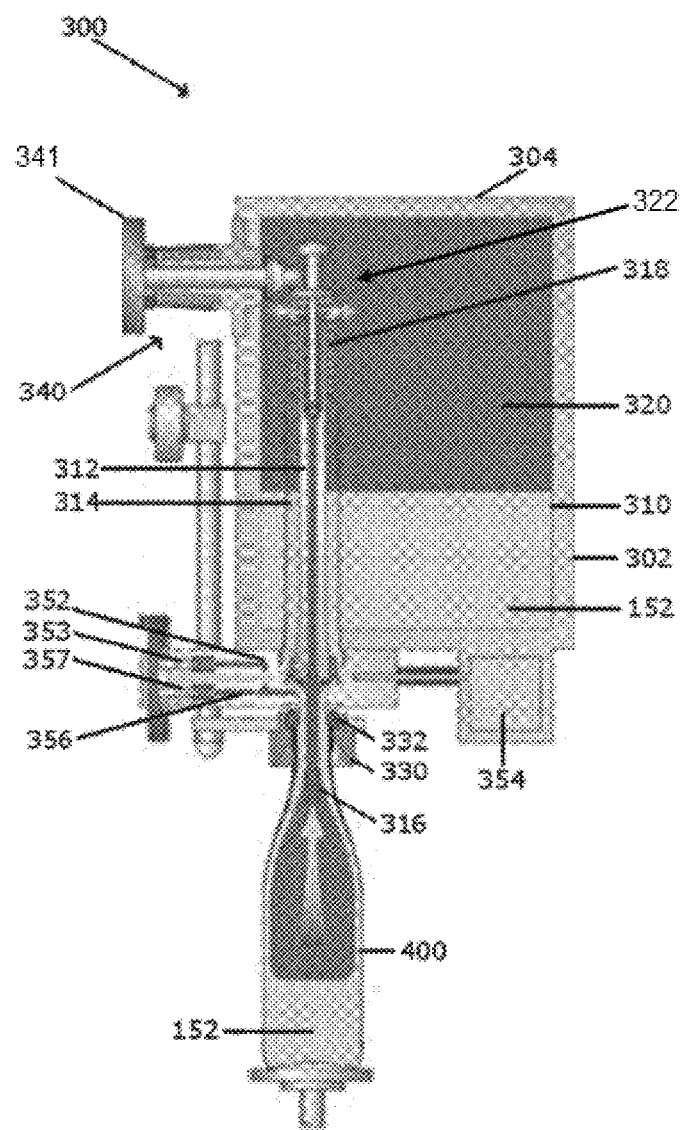
FIG. 3 is a front sectional view of a container filling system according to various aspects of the invention.

The fluid 152 can be stored in a carbonized tank 150 prior to traveling to a filling machine 300 for dispensing into a container 400 (FIG. 3). In one aspect, carbonized tank 150 can be pressurized at approximately 5.5 bar. In another aspect, carbonized tank 150 can be pressurized at approximately 0.5 bar higher than filling machine 300.

Fluid 152 can exit carbonized tank 150 through product supply conduit 200 and can enter product cooling conduit 202 to cool fluid 152 by passing fluid 152 through cooing system 160. In one aspect, fluid 152 can enter cooing system 160 at approximately 11.8 degrees Celsius and can exit cooling system 160 at approximately 6.8 degrees Celsius. In another aspect, carbonized tank 150 can be fluidly connected to filling machine 300 such that fluid 152 can be maintained at ambient temperature in carbonized tank 150 and in filling machine 300.

In one aspect of the invention, the treated water, fluid mixture, and product fluid 152 can have a laminar flow as they move through mixing system 10. This laminar flow can reduce foam formation in the fluid 152.

Figure 2:
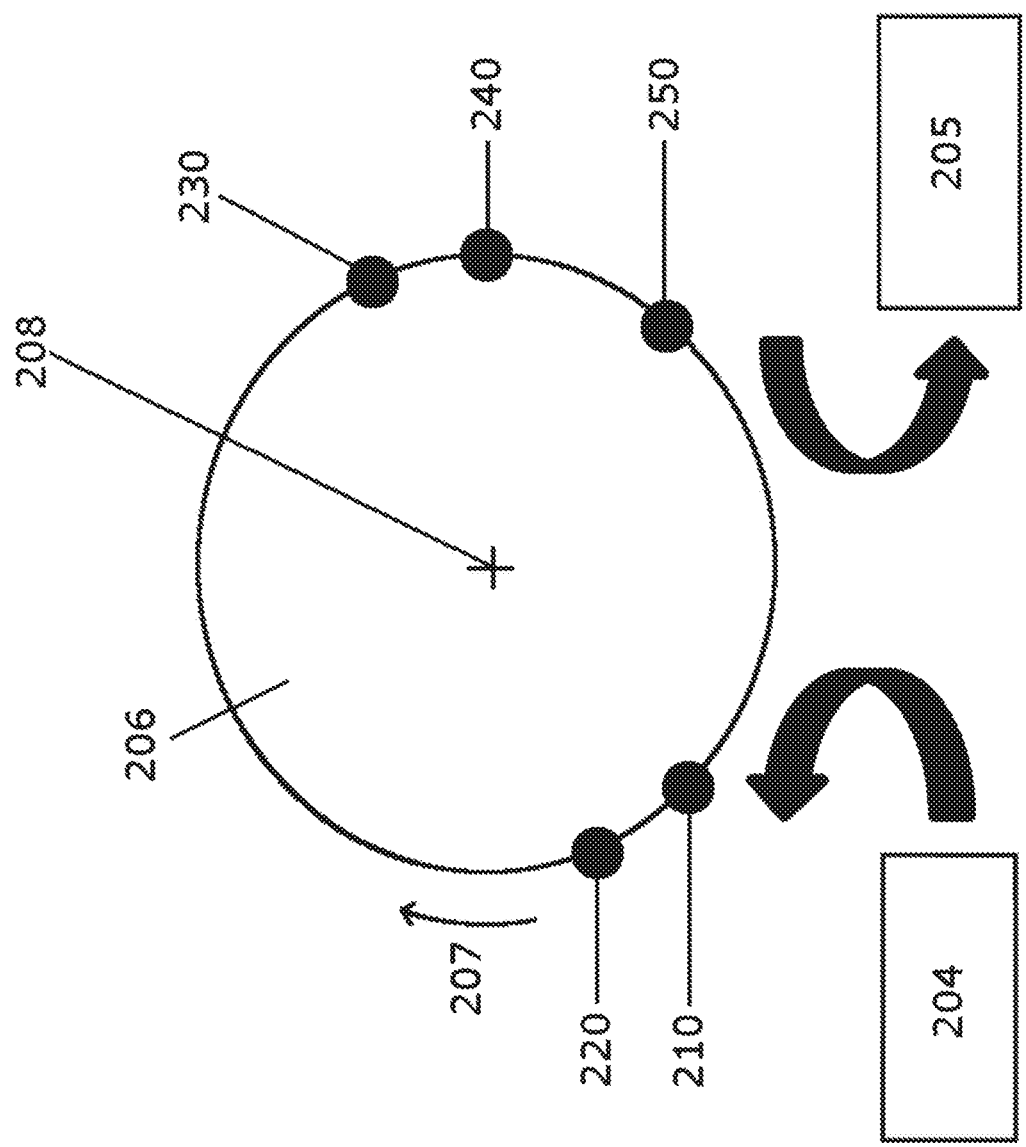
FIG. 2 is a top view of a container filling system according to various aspects of the invention.

As shown in FIG. 2, a carousel 206 is part of the filling system to fill a container 400 with a product fluid 152. Carousel 206 rotates about an axis 208 in the direction of container travel 207. The carousel 206 includes a fluid tank and product supply pipes (not shown) that extend from the carbonized tank 150 to a corresponding filling machine 300 (FIG. 3). The filling machine 300 will be discussed in greater detail below.

An in-feed station 204 is positioned adjacent the carousel 206 for feeding empty containers 400 into the carousel 206. In one aspect, empty container 400 can travel to in-feed station 204 from a blower (not shown) that produces desired containers 400. Containers 400 can be any suitable type of container, such as cans, jars, or bottles, which are filled with any type of fluid material, such as carbonated beverages, without deviating from the scope of the subject invention.

The in-feed station 204 can guide the containers 400 from a supply source or plastic blowing system (not shown) into carousel 206. In one aspect, containers 400 can enter a pre-cleaning station prior to entering carousel 206 to clean, rinse and sterilize containers 400 with ionized air, ozone ($O_3$), hydrogen peroxide ($H_2O_2$), and/or water.

Carousel 206 can have positions 210, 220, 230, 240, and 250 during which filling of a container 400 occurs. At position 210, a gas supply can be opened to fill a container 400 with an inert gas, e.g., carbon dioxide. The filling of container 400 with an inert gas can equalize the pressure of the filing machine 300 with the pressure of the bottle. In one aspect, the pressure within filling machine 300 can be approximately 5 bar. In another aspect, the pressure within filling machine 300 can be approximately 0.5 bar less than the pressure within carbonized tank 150.

Container 400 can travel in direction 207 to position 220. At position 220, a filling machine 300 (FIG. 3) can begin filling container 400 with fluid 152. At position 230, the filling machine can stop filling container 400 with fluid 152. Also at position 230, the gas supply can close. At position 240, gas can be released from the headspace of the container 400 to the atmosphere by an process commonly known as "snifting." At position 250, filling of container 400 can be finished.

An exit station 205 can be disposed adjacent the carousel 206 for exiting filled containers 400 from the carousel 206. The exit station 205 can transfer the filled containers 400 to a desired location.

Referring now to FIG. 3, filling machine 300 is shown in greater detail. For illustrative purposes, only one filling machine assembly 300 is illustrated and it is understood that multiple filing machines 300 can be positioned about carousel 206 to fill multiple containers 400 as containers 400 travel along direction 207. The number of filling machines 300 on carousel 206 can be dependent upon a particular application as desired by the manufacturer. A typical carousel 206 can have as many as 120 filling machines 300 disposed thereon. Further, there may be additional pre-cleaning stations and even post cleaning stations surrounding the carousel 206.

The filling machine 300 can include a support housing 302 having an upper surface 304 and a lower surface 306 defining an inner fluid chamber 310 for supplying the fluid 152 to be discharged into the corresponding container 400. The fluid 152, which is preferably a liquid beverage, can fill a portion of the fluid chamber 310 while leaving a headspace 320 above the fluid 152 for a pressurized inert gas such as carbon dioxide or nitrogen. The supply and return pipes for the fluid 152 and gas as well are not shown in these Figures.

A valve housing 330 can be mounted to the lower surface 306 of the support housing 302 for controlling the discharge of the fluid 152 into the container 400. The valve housing 330 is shown schematically in the Figures and may be of any suitable design or configuration. An annular container seal 332 can be provided within the valve housing 330 for sealingly engaging the container 400. In the embodiment shown in FIG. 3, the container seal 332 can be designed to seal against a bottle type container 400. In another aspect, the container seal 332 can be configured to accept a can. A control device 340 can be disposed adjacent the upper surface 304 of the support housing 302. The control device 340 will be discussed in greater detail below.

Figure 4:
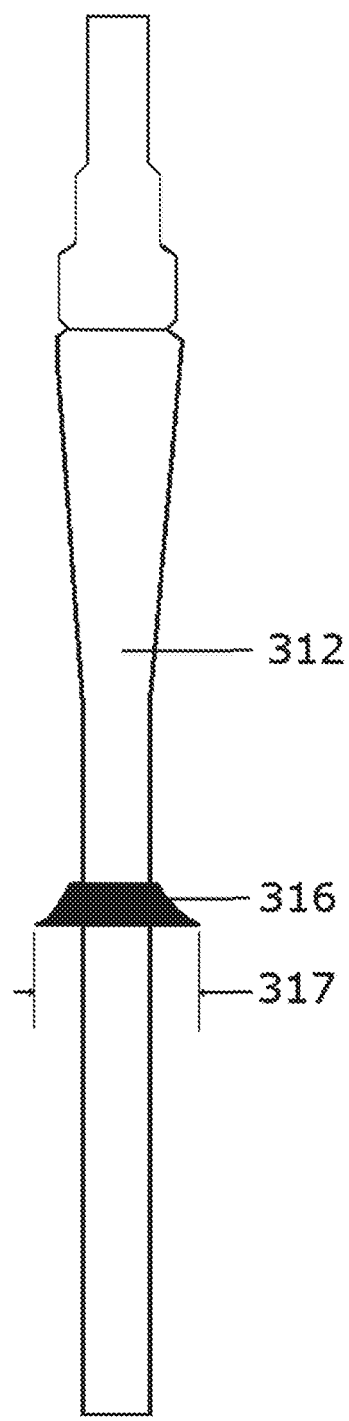
FIG. 4 is a front view of a vent tube and umbrella ring according to various aspects of the invention.

A vent tube 312 can have a first end 313a and a second end 313b with the second end 313b at least partially extending through the valve housing 330. Vent tube 312 can have a height less than approximately 4.5 mm. Vent tube 312 can have an umbellate ring 316 (FIG. 4) positioned adjacent second end 313b. Umbellate ring 316 can have a diameter 317.

The vent tube 312 can move along a predetermined stroke between a filling position and a non-use position. The second end 313b of the vent tube 312 and umbellate ring 316 can be disposed within the container 400 while in the filling position and the second end 313b of the vent tube 312 can be raised above the container 400 while in the non-use position. When vent tube 312 is in the filling position, umbellate ring 316 can be centered in the X direction and in the Y direction with respect to container 400.

The vent tube 312 can also move in accordance with desired filling levels in different sized containers 400. The overall range for the stroke of the vent tube 312 can be adjusted and is dependent upon the type and size of container 400 being filled. The vent tube 312 can be in fluid communication with the headspace 320 of the inner fluid chamber 310 in order to vent gases from the container 400 into the fluid chamber 310 during the filling of the container 400.

A support tube 314 can be mounted between the upper surface 304 and the lower surface 306 of the support housing 302 and can substantially surround the vent tube 312. In one aspect, the support housing 302 can encapsulate the central portion of the vent tube 312 while the first 313a and second 313b ends are not surrounded by the support tube 314. A plurality of seals (not shown) can be included between the vent tube 312 and the support tube 314 to support the vent tube 312 within the support housing 302.

A fluid sealing mechanism 322 including a spring 318 can be movably mounted with respect to the support tube 314 for controlling the discharge of the fluid 152 from the inner fluid chamber 310 to the container 400. The length of spring 318 can be decreased for slower valve movement. In one aspect, the spring strength can be optimized for laminar flow of fluid 152 from filling machine 300 into container 400. Valve fixing surface angle adjustments can also be made.

An actuation lever 341 can be mounted within the support housing 302 and can engage the fluid sealing mechanism 322 for manipulating the mechanism 322 between an open position which discharges the fluid 152 through the valve housing 330 and a closed position which seals the fluid chamber 310 of the support housing 302 from the valve housing 330. The fluid sealing mechanism 322 and actuation lever 341 can utilize a number of additional components to effectuate their operation.

Filling machine 300 can include a snift pipe 352 and a snift valve 353 to release gas from the headspace of the container 400 to the atmosphere when container 400 is at position 240 on carousel 206. In one aspect, the diameter of snift pipe 352 can be decreased by approximately 1.5 mm from a conventional snift pipe. Snift pipe 352 can have a diameter of greater than approximately 1.5 mm. In one aspect, snifting of container 400 can occur in two stages depending on the foaming of fluid 152 in container 400. Filling machine 300 can also include a pressure release pipe 356 and a pressure release valve 357.

The general filling operation of the filling machine 300 is now discussed. Fluid 152 can have a laminar flow through filling machine 300. In another aspect, fluid 152 can be filled into containers 400 from filling machine 300 at ambient temperature, e.g., approximately 15 degrees Celsius. Ambient filling requires less cooling and can result in significant operating cost savings.

The fluid sealing mechanism 322 can be initially closed and the vent tube 312 can be raised. Atmospheric pressure prevails in the interior of the vent tube 312. An empty container 400 moves into position below one of the valve housings 330 of the carousel 206. The container 400 can then be moved into sealing engagement with container seal 332 on the valve housing 330 and the vent tube 312 can lower into the filling position. The container 400 can be purged with the inert gas from the inner fluid chamber 310 and through the vent tube 312 in order to flush air and other impurities from the container 400. The actuation lever 341 can be actuated to lift the fluid sealing mechanism 322 to the open position. The fluid 152 can be allowed to flow from the inner fluid chamber 310 and into the container 400 while the inert gas within the container 400 vents through the vent tube 312 into the headspace 320 of the inner fluid chamber 310. The gas pressure in the container 400 and the inner fluid chamber 310 can be equalized during the filling process which allows the fluid 152 to flow into the container 400 solely under the influence of gravity. The container 400 can continue to fill until the liquid rises to the level of the second end 313b of the vent tube 312. The filling level within the container 400 can be determined by the downward position of the second end 313b of the vent tube 312. Once the fluid 152 has reached to vent tube 312, the fluid can no longer flow into the container 400 because the gases can no longer escape through the vent tube 312. After the container 400 is filled to the desired level, the actuation lever 341 can be actuated to move the fluid sealing mechanism 322 into a closed position where the fluid sealing mechanism 322 is in sealing engagement with the valve housing 330. The vent tube 312 can then rise out of the container 400 to the non-use position. Finally, gas can be released from the top of the container 400 to the atmosphere.

A cold fill system can dispense a fluid at approximately 8 degrees Celsius into a container. In one aspect of the invention, fluid 152 can be dispensed into container 400 at approximately 15 degrees Celsius resulting in significant energy savings. The filling system according to the present invention that fills containers 400 with a fluid at approximately 15 degrees Celsius can result in a reduction in system energy required to cool the fluid of approximately 60%, as compared to a cold fill system that fills at approximately 8 degrees Celsius.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A beverage container filling device for filling a beverage container with a fluid at an ambient temperature, the device comprising:
   a support housing having an upper surface and a lower surface defining an inner fluid chamber for supplying the ambient temperature fluid to be discharged into the container;
   a valve housing mounted to the lower surface for controlling the discharge of the ambient temperature fluid;
   a vent tube having a first end and a second end, the second end at least partially extending through the valve housing;
   an umbellate ring surrounding the vent tube and being positioned adjacent the second end of the vent tube;
   a spring positioned about the first end of the vent tube;
   a fluid sealing mechanism positioned adjacent to the upper surface and operating with the spring to control fluid flow of the ambient temperature fluid into the beverage container, and
   a snift pipe having a diameter of greater than approximately 1.5 mm.

2. The filling device of claim 1, wherein a pressure of the inner fluid chamber is approximately 5 bar during operation of the filling device.

3. The filling device of claim 1, wherein a pressure of the inner fluid chamber is approximately 0.5 bar less than an interior pressure of a fluid supply tank that supplies the ambient temperature fluid to the filling device.

4. The filling device of claim 1, wherein the vent tube has a height of less than approximately 4.5 mm.

5. The filling device of claim 1, wherein the filling device is configured to operate when the ambient temperature is approximately 15 degrees Celsius.

6. The filling device of claim 1, further comprising a support tube mounted between the upper surface and the lower surface, wherein the support tube substantially surrounds the vent tube.

7. The filling device of claim 1, wherein the vent tube is configured to move along a predetermined stroke between a first position and a second position.

8. The filling device of claim 7, wherein the first position comprises a filling position and the second position comprises a non-use position.

9. The filling device of claim 7, wherein when the vent tube is at the first position, the umbellate ring is centered in an X direction and in a Y direction with respect to the beverage container.

10. A beverage container filling device for filling a beverage container with a fluid at an ambient temperature, the device comprising:
    a support housing having an upper surface and a lower surface defining an inner fluid chamber for supplying the ambient temperature fluid to be discharged into the container;
    a valve housing mounted to the lower surface for controlling the discharge of the ambient temperature fluid;
    a vent tube having a first end and a second end, the second end at least partially extending through the valve housing;
    an umbellate ring surrounding the vent tube and being positioned adjacent the second end of the vent tube;
    a spring positioned about the first end of the vent tube;
    a fluid sealing mechanism positioned adjacent to the upper surface and operating with the spring to control fluid flow of the ambient temperature fluid into the beverage container; and
    an actuation lever mounted within the support housing, wherein the actuation lever is configured to manipulate the fluid sealing mechanism between an open position and a closed position.

11. A beverage container filling system, comprising:
    a carbonized tank filled with an ambient temperature fluid;
    a beverage container filling device;
    a carousel comprising at least one product supply pipe extending from the carbonized tank to the beverage container filling device; and
    a gas supply coupled to the carousel,
        wherein the carousel is configured to rotate from a first position to a second position,
        wherein the gas supply is configured to fill a container with an inert gas when the carousel is rotated to the first position,
        wherein the beverage container filling device is configured to fill the container with the fluid when the carousel is rotated to the second position, and
        wherein the ambient temperature fluid is maintained at an ambient temperature during operation of the beverage container filling device.

12. The beverage container filling system of claim 11, wherein the carousel is further configured to rotate from the second position to a third position, from the third position to a fourth position, and from the fourth position to a fifth position.

13. The beverage container filling system of claim 12, wherein the gas supply is configured to close when the carousel is rotated to the third position.

14. The beverage container filling system of claim 12, wherein the beverage container filling device is configured to stop filling the container with the ambient temperature fluid when the carousel is rotated to the third position.

15. The beverage container filling system of claim 12, wherein the beverage container filling device comprises a snift pipe, and wherein the snift pipe is configured to release a volume of the inert gas from a headspace of the container when the carousel is rotated to the fourth position.

16. The beverage container filling system of claim 11, wherein the ambient temperature is approximately 15 degrees Celsius.

17. The beverage container filling system of claim 11, further comprising an exit station disposed adjacent the carousel, wherein the exit station is configured to transfer a filled container from the carousel to a desired location.

18. A beverage container filling system, comprising:
- a carbonized tank filled with an ambient temperature fluid;
- a beverage container filling device, comprising:
  - a support housing having an upper surface and a lower surface defining an inner fluid chamber for supplying the fluid to be discharged into the container;
  - a valve housing mounted to the lower surface for controlling the discharge of the fluid;
  - a vent tube having a first end and a second end, the second end at least partially extending through the valve housing;
  - an umbellate ring surrounding the vent tube and being positioned adjacent the second end of the vent tube;
  - a spring positioned about the first end of the vent tube; and
  - a fluid sealing mechanism positioned adjacent to the upper surface and operating with the spring to control fluid flow into the beverage container;
- a carousel comprising at least one product supply pipe extending from the carbonized tank to the beverage container filling device; and
- a gas supply coupled to the carousel,
  - wherein the carousel is configured to rotate from a first position to a second position,
  - wherein the gas supply is configured to fill a container with an inert gas when the carousel is rotated to the first position,
  - wherein the beverage container filling device is configured to fill the container with the ambient temperature fluid when the carousel is rotated to the second position, and
  - wherein the ambient temperature fluid is maintained at an ambient temperature during operation of the beverage container filling device.

* * * * *

UNITED STATES PATENT AND TRADEMARK OFFICE
CERTIFICATE OF CORRECTION

PATENT NO. : 11,124,402 B2  
APPLICATION NO. : 16/673855  
DATED : September 21, 2021  
INVENTOR(S) : Bulunmaz Page 1 of 1

It is certified that error appears in the above-identified patent and that said Letters Patent is hereby corrected as shown below:

On the Title Page

Column 1, item (62), under "Related U.S. Application Data", Line 1, delete "15/348,286," and insert -- 15/346,286, --, therefor.

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*